(12) United States Patent
Clauberg et al.

(10) Patent No.: US 12,152,513 B2
(45) Date of Patent: Nov. 26, 2024

(54) VARIABLE-LIFT VALVE TRAIN HAVING AT LEAST TWO WORKING POSITIONS

(71) Applicant: Bayerische Motoren Werke Aktiengesellschaft, Munich (DE)

(72) Inventors: Jan Clauberg; Steffen Lohde, Munich (DE); Giovanni Mincione, Munich (DE); Sebastian Sperrhacke, Schweitenkirchen (DE); Din Wabbals, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/295,087

(22) PCT Filed: Nov. 6, 2019

(86) PCT No.: PCT/EP2019/080347
§ 371 (c)(1),
(2) Date: May 19, 2021

(87) PCT Pub. No.: WO2020/108933
PCT Pub. Date: Jun. 4, 2020

(65) Prior Publication Data
US 2022/0090523 A1    Mar. 24, 2022

(30) Foreign Application Priority Data
Nov. 30, 2018   (DE) ..................... 10 2018 130 428.5

(51) Int. Cl.
  *F01L 13/00*   (2006.01)
  *F01L 1/053*   (2006.01)
  (Continued)

(52) U.S. Cl.
  CPC ........... *F01L 13/0005* (2013.01); *F01L 1/053* (2013.01); *F01L 1/185* (2013.01); *F01L 13/0063* (2013.01);
  (Continued)

(58) Field of Classification Search
  CPC ... F01L 13/0005; F01L 13/0063; F01L 1/053; F01L 1/185; F01L 2013/0068;
  (Continued)

(56) References Cited

U.S. PATENT DOCUMENTS 6,928,969 B2 *   8/2005   Bloms ................. F02D 13/0269
                                                    123/320
7,225,773 B2 *   6/2007   Schleusener ........ F01L 13/0026
                                                    123/90.31
(Continued)

FOREIGN PATENT DOCUMENTS

DE    100 16 103 A1   10/2001
DE    101 40 635 A1    4/2003
(Continued)

OTHER PUBLICATIONS

International Search Report (PCT/ISA/210) issued in PCT Application No. PCT/EP2019/080347 dated Jan. 29, 2020 with English translation (six (6) pages).
(Continued)

*Primary Examiner* — Kenneth J Hansen
*Assistant Examiner* — Kelsey L Stanek
(74) *Attorney, Agent, or Firm* — Crowell & Moring LLP

(57) ABSTRACT

A variable-lift valve train for a gas exchange valve of an internal combustion engine includes a lift adjuster, a lift actuator, and a lift lever. The lift adjuster has a working curve that is arrangeable at least in a first working position for setting a partial lift and in a second working position for setting a maximum lift. The working curve has a lift region
(Continued)

and a base circle region. The lift actuator, which has an actuating contour configured to deflect the lift adjuster. The lift lever, which is deflectable via the working curve and thereby actuates a lift of the gas exchange valve. The valve train is configured to, in the first working position and in the second working position, actuate the gas exchange valve with an at least substantially equal maximum valve acceleration.

13 Claims, 3 Drawing Sheets

(51) Int. Cl.
  *F01L 1/18*   (2006.01)
  *F02D 13/02*   (2006.01)
  *F02D 41/14*   (2006.01)

(52) U.S. Cl.
  CPC ..... *F02D 13/0226* (2013.01); *F02D 13/0269* (2013.01); *F02D 41/1446* (2013.01); *F01L 2013/0068* (2013.01); *F01L 2305/00* (2020.05)

(58) Field of Classification Search
  CPC ............... F01L 2305/00; F01L 13/0226; F01L 13/0269; F01L 1/462; F01L 1/08; F01L 1/2405; F01L 1/34; F02D 13/0226; F02D 13/0269; F02D 41/1446; Y02T 10/12
  USPC ................................ 123/90.16, 90.15, 90.31
  See application file for complete search history.

(56) References Cited

U.S. PATENT DOCUMENTS

| | | | | |
|---|---|---|---|---|
| 7,398,750 | B2* | 7/2008 | Fujita | F01L 13/0026 123/90.31 |
| 7,503,297 | B2* | 3/2009 | Fujita | F01L 1/34 123/90.31 |
| 9,004,023 | B2* | 4/2015 | Christgen | F02D 13/0273 123/90.39 |
| 10,337,365 | B2* | 7/2019 | Sperrhacke | F02B 75/20 |
| 2003/0037739 | A1 | 2/2003 | Wurms et al. | |
| 2004/0069054 | A1* | 4/2004 | Shimizu | F01L 1/053 123/90.11 |
| 2004/0144347 | A1 | 7/2004 | Schleusener et al. | |
| 2017/0218795 | A1 | 8/2017 | Yamaguchi et al. | |

FOREIGN PATENT DOCUMENTS

| | | |
|---|---|---|
| DE | 10 2014 013 664 A1 | 3/2016 |
| DE | 10 2015 214 115 A1 | 2/2017 |
| EP | 1 387 928 B1 | 7/2006 |
| FR | 2 928 686 A3 | 9/2009 |
| WO | WO 02/092972 A1 | 11/2002 |

OTHER PUBLICATIONS

German-language Written Opinion (PCT/ISA/237) issued in PCT Application No. PCT/EP2019/080347 dated Jan. 29, 2020 (seven (7) pages).

* cited by examiner ated contour of the lift actuator (for example of the cam

VARIABLE-LIFT VALVE TRAIN HAVING AT LEAST TWO WORKING POSITIONS

BACKGROUND

This disclosure relates to a variable-lift valve train for a gas exchange valve of an internal combustion engine, and to a method for operating a variable-lift valve train for a gas exchange valve of an internal combustion engine.

Owing to the increasing requirements for low fuel consumption and low emissions, there is an ever-greater requirement for enrichment-free operation across the entire engine characteristic map. Use of the Miller combustion process makes an important contribution here. The pressure and temperature of the mixture in the cylinder at the ignition time can thereby be lowered in targeted fashion. Owing to the correspondingly reduced knocking tendency, an earlier concentration point of the combustion can be set, for example by means of a variable camshaft controller. The corresponding lowering of the exhaust-gas temperature leads to a lower requirement for enrichment.

The Miller internal combustion engine is an internal combustion engine named after Miller in the case of which the fuel is introduced during the intake process into the intake air, which, as in the case of the Otto engine, results in an ignitable mixture in the cylinder. By contrast to the Otto engine, a Miller internal combustion engine is distinguished by a fifth working step. The Miller internal combustion engine is therefore also referred to as a "five-stroke" engine. The inlet valve is closed already during the intake stroke, leading to an expansion of the mixture up until the end of the intake stroke. In the subsequent compression phase, there are consequently a lower pressure and a lower temperature in the combustion chamber at the ignition time. This reduces the so-called knocking tendency.

The consequences of these changes are a lower exhaust-gas temperature, fewer pollutants and high efficiency of the internal combustion engine.

If an internal combustion engine is to be operated in accordance with the Miller combustion process, then the inlet valve lift curve must not overshoot a certain opening duration. This short opening duration is considerably shorter than that of internal combustion engines operated with the conventional Otto cycle process. There is thus generally a resulting considerably increased charge pressure requirement, which in turn limits the maximum power yield.

With regard to the technical context, reference is made for example to the European patent EP 1 387 928 B1. Said document discloses a valve train device for the variable adjustment of the lift of a gas exchange valve of an internal combustion engine, in the case of which the gas exchange valve is connected via a transmission element to a roller which is movable about an axis of rotation, and a control track, which comprises an idle stroke curve and a lift curve, in an end region of a pivot lever which, for the actuation of the lift of the gas exchange valve, is controlled by a camshaft, wherein the pivot lever, which is assigned to the cam in spring-loaded fashion via a curve track, is, at the other end, for the purposes of variable lift adjustment, supported along a circular path by means of an oscillatory center of rotation which is variable in position in a manner controlled by means of an adjustment device and is fixable. The valve train device is characterized in that a circular track, arranged on a housing part of the internal combustion engine, as slotted guide with a radius about the axis of rotation of the roller of the transmission element serves for the controlled, positionally variable support of the pivot lever, wherein the control track of the pivot lever is, in the transition region between idle travel curve and lift curve, formed with a ramp which is adapted to a valve play in the valve train device.

If it is sought to operate an internal combustion engine with such a valve train with a combustion process in which there is a reduced gas exchange valve lift in the region of maximum power (Miller process), the limits of the dynamics of the valve train are not fully utilized, because the maximum gas exchange valve lift must also be attainable at maximum rotational speed.

DE 10 2015 214 115 A1 has disclosed a variable-lift valve train in the case of which the pivot lever (referred to in said document as intermediate lever) is pivoted by means of an eccentric which has a rest region such that operationally reliable maximum gas exchange valve acceleration is obtained where it is functionally expedient.

In order to satisfy the charge exchange requirements as best as possible, it is however necessary, for a given maximum opening duration, to maximize the control cross section (area below the valve lift curve). In order to nevertheless realize a valve train which is mechanically robust at the required engine maximum rotational speed, it is however the case in some valve trains of the above-described type that the valve accelerations are limited with regard to their maximum, minimum and profile. Both boundary conditions—valve opening duration and limited valve acceleration—result in a maximum implementable control cross section and valve lift.

SUMMARY

Against this background, it is an object of this disclosure to improve a variable-lift valve train for a gas exchange valve of an internal combustion engine.

Said object is achieved by means of the inventive variable-lift valve train and the inventive method for operating a variable-lift valve train disclosed herein.

According to one aspect of the disclosure, a variable-lift valve train for a gas exchange valve of an internal combustion engine is proposed. The internal combustion engine may for example be an Otto engine or a diesel engine.

The variable-lift valve train has a lift adjuster with a working curve which can be arranged at least in a first working position for setting a partial lift and in a second working position for setting a maximum lift, wherein the working curve has a maximum curve curvature in one region.

Furthermore, the variable valve train has a lift actuator which has an actuating contour for deflecting the lift adjuster.

Furthermore, the variable valve train has a lift lever which can be deflected by means of the working curve and can thus actuate a lift of the gas exchange valve, wherein, in particular, the working curve of the deflected lift adjuster, as it moves over a contact surface of the lift lever, can actuate the gas exchange valve.

The valve train is configured to, in the first working position and in the second working position, actuate the gas exchange valve with an at least substantially equal maximum valve acceleration.

In order to configure the valve train for this, a person skilled in the art may use tools for optimizing the topology of drive components. This approach has proven more expedient as a trial and error approach, as would be used for example in the case of the iterative adjustment of an actucontour of a cam of the camshaft). The contour of the individual components involved in the movement of the valves is in this case normally influenced indirectly by way of the movement specifications (for example valve lift versus cam angle).

In the present case, the approach according to the disclosure encompasses the solution of a multivariate problem: for the configuration according to the disclosure of the valve train, said valve train must allow an at least substantially equal maximum valve acceleration in the two working positions. For this purpose, the contours of the lift actuator (actuating contour), of the lift adjuster (including the working curve) and of the lift lever must be coordinated with one another.

In particular, it is thus necessary—independently of the positioning of the working curve in the first or in the second working position—for the valves to be deployed with an equal maximum acceleration in the case of a particular rotational speed of the lift actuator (for example of the camshaft).

In a typical configuration of the valve train, in one embodiment, the lift adjuster is an intermediate lever (also referred to as pivot lever), which, at one side, is mounted in slidingly movable fashion on a slotted-guide track of a slotted guide and which, at the other side, has the working curve, wherein the intermediate lever is displaceable by means of a second actuating device along the slotted-guide track.

In a typical configuration of the valve train, in one embodiment, the lift lever is an intermediate element such as for example a roller-type valve lever, via which the working curve is operatively connected to the gas exchange valve.

In a typical configuration of the valve train, in one embodiment, the lift actuator is a first actuating device, in particular a cam of a camshaft, for pivoting the intermediate lever about a point close to the slotted guide counter to a spring force of a spring element.

According to a further aspect, a method for operating a variable-lift valve train for a gas exchange valve of an internal combustion engine, which is designed in particular in accordance with an embodiment of the disclosure, is proposed. The method has at least the following steps: (i) ascertaining an exhaust-gas temperature and/or a characteristic of at least one other temperature parameter of the internal combustion engine; (ii) ascertaining an operating mode to be implemented, in particular a conventional operating mode or a Miller operating mode, in a manner dependent on the ascertained temperature; and (iii) switching the lift adjuster into the first working position or into the second working position of the working curve in a manner dependent on the ascertained operating mode.

The disclosure is based inter alia on the following consideration: in conjunction with a variable valve train, it is the intention for the opening duration required for Miller operation to be set at any desired point in time. In the event of a demand for full load, it is firstly the case that conventional (non-Miller) operation (Otto cycle process) with at least approximately maximum opening duration is set, in particular by virtue of the second working position of the lift adjuster of the valve train being set.

Owing to the thermal inertia of the components, the maximum admissible exhaust-gas temperature is reached only after a time delay after the commencement of full load, and the low charge pressure requirements of the conventional control timing has a positive effect on drivability and power yield. Only when the maximum exhaust-gas temperature is reached is the internal combustion engine switched to Miller operation, in particular by virtue of the first working position of the lift adjuster of the valve train being set.

The exhaust-gas temperature and/or other relevant operating temperatures may in this case be determined for example by means of a physical model and/or by means of a sensor.

Valve trains used in products of the applicant allow the shortening of the opening duration, as is required for implementing Miller operation, under conditions close to full load, but this can result in a severe reduction of the valve lift and thus of the control cross section. By contrast, a valve train configured in targeted fashion for Miller operation leads to an improved Miller lift profile. In the case of a similar opening duration, the result is a larger control cross section than before. A challenge now consists in making a fully variable valve train which is configured for Miller operation capable also of implementing larger control cross sections. It is furthermore the intention for the full-lift profile to allow non-Miller operation with a small increase in the charge pressure requirement in relation to the present valve train.

The disclosure is now based inter alia on the concept of achieving, overall, and optimum compromise between non-Miller operation and Miller operation, which maximizes the advantages of the combined operating strategy. In order to as far as possible also achieve an optimum valve lift curve for conventional operation, it is in particular the case that the valve train is configured such that, for example, clearances and/or other functional aspects allow a greater lift than the maximum lift that can be implemented with the Miller opening duration.

The Miller valve lift is configured not as the maximum valve lift of the system, but rather as a partial lift. If the setpoint valve lift is now increased beyond the Miller lift, the opening duration increases and the control cross section increases, until the maximum lift in functional terms is attained.

It is crucial inter alia that, during the desired lift adjustment up to the absolute maximum valve lift, no increase of the valve acceleration occurs that exceeds the admissible limits with regard to profile and maximum. Accordingly, the fully variable valve train is in particular configured such that the accelerations in the Miller valve lift range, and from there onward up to the absolute valve lift maximum, are virtually constantly at a maximum. It is thus ensured that both a conventional valve lift and a Miller valve lift can open up the maximum possible control cross section and is at the same time mechanically robust.

For a corresponding adjustment of the valve train, a person skilled in the art can use tools for optimizing the topology of drive components. To achieve a mutually corresponding maximum acceleration, the cam contour, the contour of the intermediate lever in the contact region with the cam and at the working curve, and the contact region of the roller-type valve lever with the working curve must be coordinated with one another. In the business practice of the applicant, it is for example expedient to adjust the cam contour in order that the existing valve train assembly in the narrower sense can continue to be used unchanged.

A valve train adapted in this way has yet further advantages owing to the possibility of setting lifts and opening durations above the defined Miller valve lift profile.

If the engine is operated under different boundary conditions (temperature, elevation etc.), the optimum Miller setpoint opening duration may thus vary. The optimum opening duration can now always be set in accordance with these boundary conditions and the resulting operating strategy, and, here, always opens up the best possible control cross section.

If it is the intention for the valve train to be installed as an identical part in different engines with different peripherals and/or general operating strategy, this is possible without making changes to the kinematic arrangement. The optimum opening duration that differs depending on the engine can be set without hardware modifications, and always opens up the best possible control cross section.

In particular in the case of a constant maximum curve curvature, it is the case in one embodiment that the working curve of the lift adjuster has a maximum curve curvature in one region, wherein the actuating contour of the lift actuator is configured to move the working curve in the first working position and in the second working position with a constant speed for as long as the contact surface of the lift lever lies against the region of the maximum curve curvature of the working curve.

In order to achieve the at least substantially equal maximum acceleration of the gas exchange valve, it is the case in one embodiment that the region of maximum curvature is arranged at an edge of the lift region, in particular, the edge of the lift region is that which is passed by a contact element of the lift lever on the working curve at the start and the end of the lift process.

In order to achieve the at least substantially equal maximum acceleration of the gas exchange valve, it is the case in one embodiment that the lift region has an at least less-curved, in particular non-curved, region, which is in particular arranged so as to directly adjoin the region of maximum curvature.

In particular, a contact position of the lift lever with the working curve when the maximum lift is reached, and/or a contact position of the lift lever with the working curve when the Miller lift is reached, is arranged at the less-curved region.

In order to be able to actuate the valve lift as early as possible during Miller operation, it is the case in one embodiment that the valve train is configured to adjust an actuating time of the lift actuator, in particular by means of a variable camshaft controller.

In one embodiment, the engine, in particular the engine controller, has a sensor-based and/or model-based temperature detection device for detecting an exhaust-gas temperature and/or at least one other temperature parameter of the internal combustion engine.

In one embodiment, the valve train has a control unit for the operation of the valve train, which control unit is in particular configured to set different working positions of the working curve. The control unit may for example be a part of a superordinate engine controller, drive controller or vehicle control device.

In one embodiment, when the Miller operating mode is implemented, an earlier actuation time of the lift actuator is set, in particular by means of a variable camshaft controller.

Other objects, advantages and novel features of the present disclosure will become apparent from the following detailed description of one or more preferred embodiments when considered in conjunction with the accompanying drawings, in which:

DETAILED DESCRIPTION

Figure 1:
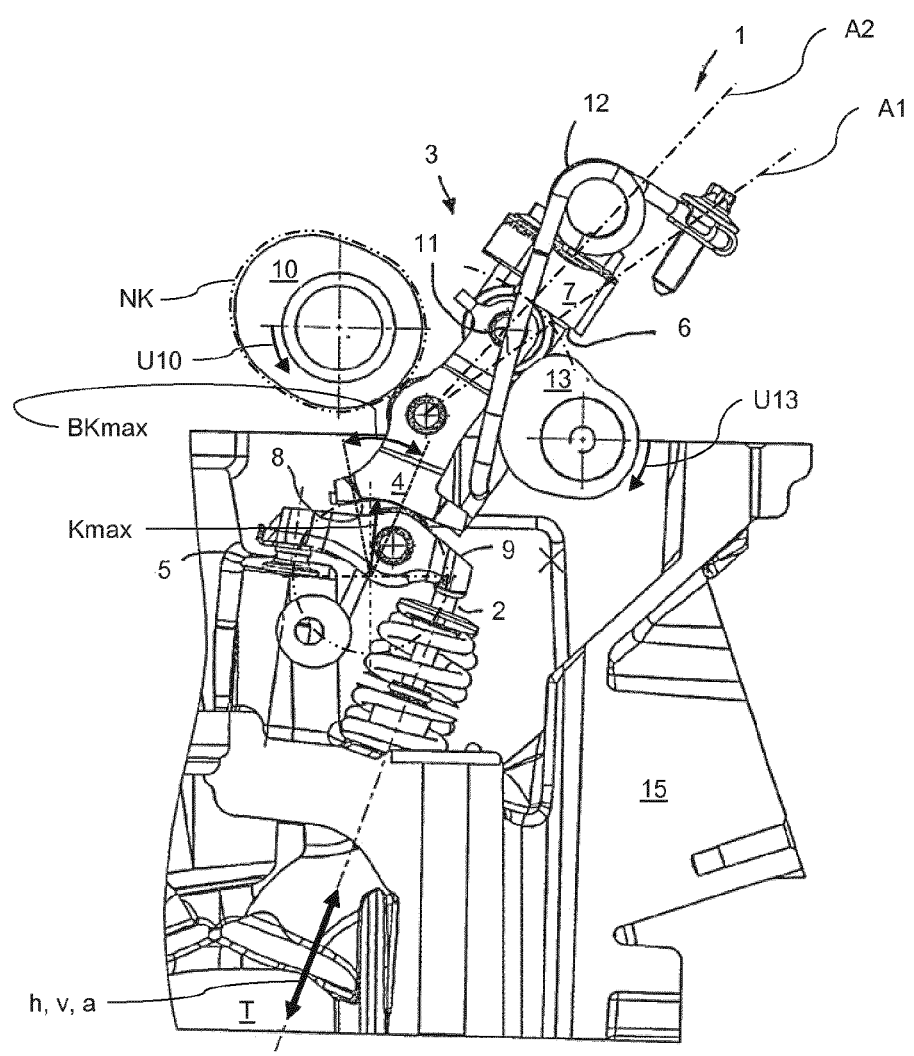
FIG. 1 depicts a section through a variable-lift valve train.

FIG. 1 shows a section through a variable-lift valve train 1 in an installed position in a cylinder head 15 for an internal combustion engine (not illustrated), in a view directed toward a first gas exchange valve operating unit 3. The gas exchange valve operating unit 3 is provided for the operation of identically acting gas exchange valves 2. In the present exemplary embodiment, the internal combustion engine has four cylinders in an in-line configuration, with in each case two identically acting gas exchange valves 2.

The variable-lift valve train 1 arranged in the cylinder head 15 has a lift adjuster 4, an intermediate lever, which, at one side, is mounted by means of a roller (without reference designation) with sliding and rolling movement capability on a slotted-guide track 6 of a slotted guide 7 and, at the other side, has a working curve 8.

Figure 3:
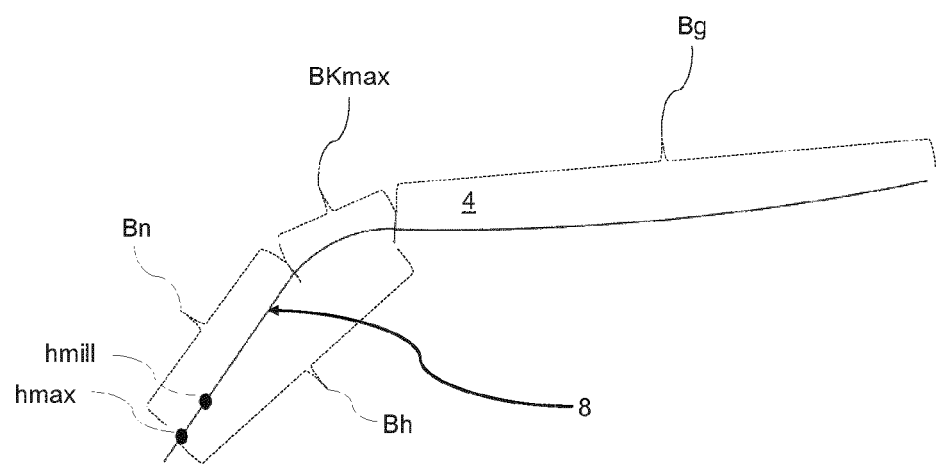
FIG. 3 depicts the working curve of the valve train according to FIG. 1.

As can be seen from FIG. 3, the working curve is divided into a base circle region Bg and a lift region Bh, wherein the working curve 8 has, at least in a part of the lift region Bh, a region BKmax with a constant maximum curvature Kmax. In a further region Bn adjoining this, the lift region Bh has no curvature or at least a lesser curvature.

The working curve 8 is operatively connected via a lift lever 9, a roller-type valve lever, to a gas exchange valve 2 such that the gas exchange valve 2 can, at a particular lift h, be deflected along the plotted axis with a speed v and an acceleration a.

The roller-type valve lever 9 is supported at one side on a shank of the gas exchange valve 2 and at the other side on a play compensation element 5, a hydraulic play compensation element.

Furthermore, a lift actuator 10 (also referred to as first actuating device 10), a cam of a camshaft, is provided, having an actuating contour NK (cam contour) for pivoting the intermediate lever 4 about a point 11 close to the slotted guide, a center of rotation of the roller supported on the slotted-guide track 6, counter to a spring force of a spring element 12. The actuating contour NK is defined by a radius profile about the center of rotation of the cam 10 along the plotted circumferential direction U10.

The intermediate lever 4 is displaceable by means of a second actuating device 13, an eccentric disk of an eccentric shaft, along the slotted-guide track 6 via the roller which supports the intermediate lever 4 on the slotted-guide track 6. Correspondingly to an eccentric contour of the second actuating device 13, the intermediate lever 4 be displaced between a zero working position (not shown), a first working position A1 for Miller operation and a second working position A2 for normal operation. The eccentric contour is defined by a radius profile about the center of rotation of the eccentric along the plotted circumferential direction U13.

With regard to the functioning of the variable-lift valve train 1 per se, reference is also made to the international patent application WO 2002/092972 A1.

The second actuating device 13 thus has a zero setting point for a zero lift, a second setting point for a partial lift and a third setting point for a full lift of the gas exchange valve 2. Each setting point is constituted by a curve point of a circular segment of the eccentric disk, that is to say, during the rotation of the second actuating device 13, the intermediate lever 4 is displaced in terms of its position along the slotted-guide track 6, whereby a gas exchange valve lift caused by a rotation of the lift actuator 10 is variable.

Zero lift means that the gas exchange valve 2 is immobilized, which corresponds to a cylinder deactivation. Partial lift means that the gas exchange valve 2 has a gas exchange valve lift smaller than a full lift, for example during Miller operation. Full lift means the maximum possible valve lift.

In further exemplary embodiments, the second actuating device 13 may also, instead of a cam disk, be replaced by linear actuating devices which have different stops or detent devices corresponding to the zero lift, the partial lift and the full lift of the gas exchange valve 2. The operation may be implemented here electrically and/or mechanically or hydraulically. In the present exemplary embodiment, the operation is performed electromotively.

In order to allow at least substantially equal maximum valve acceleration in the first working position A1 and the second working position A2, the contours of the lift actuator (actuating contour NK), of the lift adjuster 4 (including the working curve 8) and of the lift lever 9 have been coordinated with one another in the design of the valve train 1.

In the exemplary embodiment, a common software tool for optimizing the topology of drive components was used for a corresponding adjustment of the valve train. To achieve mutually corresponding maximum acceleration amax and −amax in the first working position A1 and in the second working position A2, the cam contour NK, the contour of the intermediate lever in the contact region with the cam 10 and on the working curve 8, and the contact region of the roller-type valve lever 9 with the working curve 8 were coordinated with one another.

In the exemplary embodiment, here, only the cam contour NK was suitably adapted in order that the existing valve train assembly, the gas exchange valve operating unit 3, can continue to be used unchanged.

The manner in which the cam contour NK—that is to say the radius profile of the cam 10 along the circumferential direction U10—has to be adapted in the individual application in order to attain the mutually corresponding maximum accelerations amax is apparent to a person skilled in the art in the individual case from the use, of a software tool, for topology optimization, and from the requirements from the operating strategy of the engine.

An embodiment of a method according to an exemplary embodiment of this disclosure is discussed below on the basis of FIG. 2.

Figure 2:
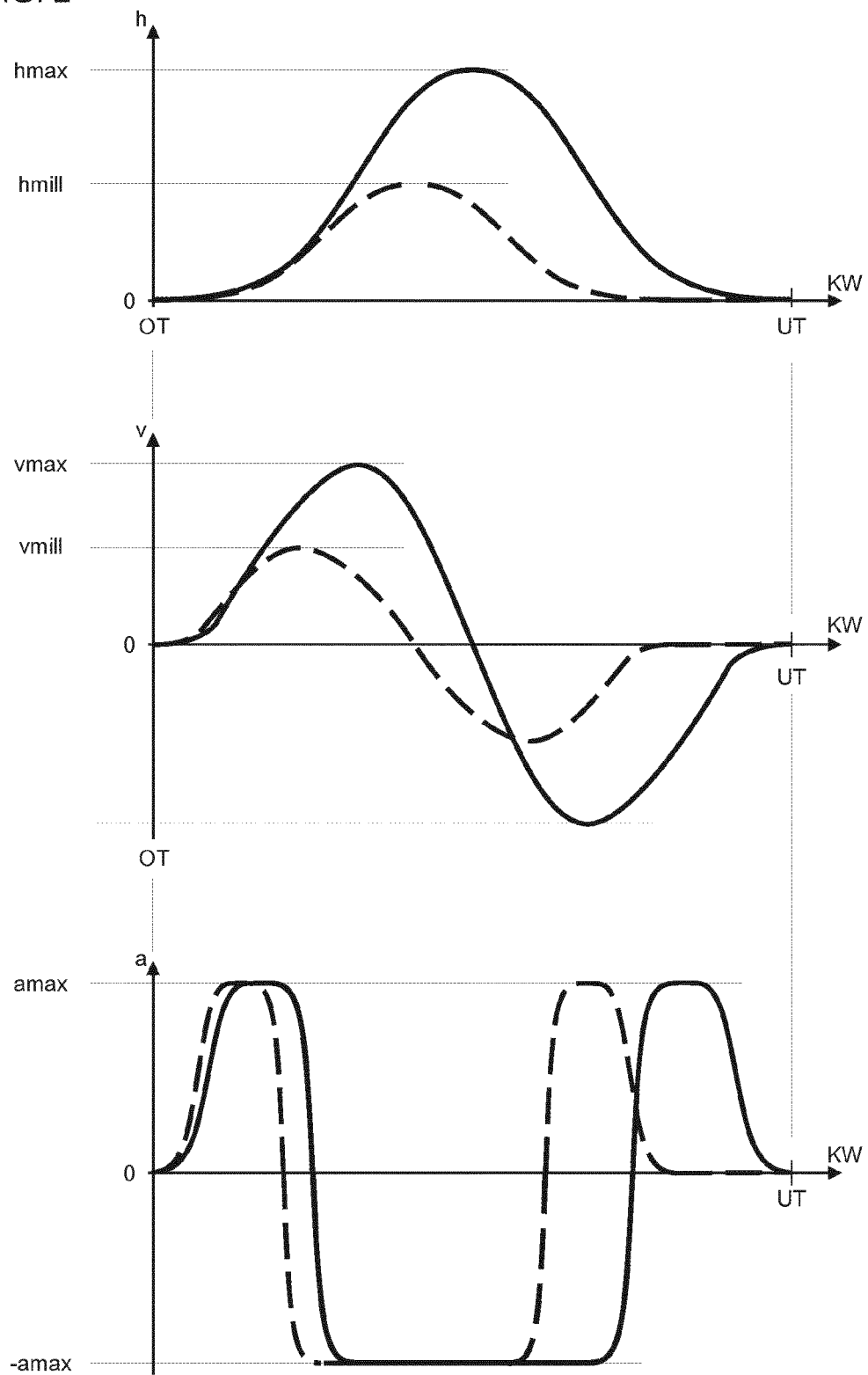
FIG. 2 is diagrams in which, for one rotation of the camshaft of the variable-lift valve train according to FIG. 1, the lift of the gas exchange valve and the speed of the valve deflection or the acceleration during the valve deflection is plotted in each case versus a crank angle of the crankshaft when the valve train according to FIG. 1 is operated.

FIG. 2 shows three diagrams: the lift h is plotted versus the crank angle KW in the upper diagram, the lift speed v is plotted versus the crank angle KW in the middle diagram, and the lift acceleration a is plotted versus the crank angle KW in the lower diagram.

In each of the three diagrams, the corresponding variable development h, v, a is plotted versus the crank angle on the one hand for a maximum lift hmax (solid line) and on the other hand for a Miller lift (partial lift; dashed line).

In the event of a demand for full load, it is firstly the case that conventional (non-Miller) operation with at least approximately maximum opening duration is set, in particular by virtue of the second working position of the lift adjuster of the valve train being set. This operating situation is illustrated in the diagrams by solid lines.

Only when a maximum exhaust-gas temperature T is reached (see the exemplary label in FIG. 1 in the combustion chamber; is ascertained in model-based fashion in the exemplary embodiment), the internal combustion engine is switched to Miller operation, in particular by virtue of the first working position of the lift adjuster of the valve train being set. This operating situation is illustrated by dashed lines in the diagrams.

The upper diagram (lift diagram) shows firstly the lower lift height hmill during Miller operation—in relation to the maximum lift hmax. Secondly, a variable camshaft controller which is not illustrated in FIG. 1 has the effect that, in relation to the crank angle during Miller operation, the highest lift hmill occurs earlier than the highest lift hmax does during normal operation.

It can be seen from the middle diagram (Speed diagram) that, for Miller operation, a lower maximum speed vmill of the valve 2 during the actuation is sufficient—in relation to the maximum speed vmax during normal operation.

The lower diagram (acceleration diagram) shows the adjustment of the cam contour NK according to this exemplary embodiment of the disclosure: both for normal operation and for Miller operation, the greatest accelerations amax and −amax are identical. In those crank angle ranges in which the greatest accelerations amax and −amax occur in the acceleration diagram, the working curve 8 rolls in its region of maximum curvature BKmax on the roller-type valve lever 9.

As can be seen from FIG. 3, a roller of the roller-type valve lever 9 makes contact with the working curve at the point hmill or at the point hmax depending on the operating mode, that is to say in each case in the region Bn.

LIST OF REFERENCE DESIGNATIONS

1 Valve train
2 Gas exchange valve
3 Gas exchange valve operating unit
4 Lift adjuster (in particular intermediate lever)
5 Play compensation element
6 Slotted-guide track
7 Slotted guide
8 Working curve
9 Lift lever (in particular roller-type valve lever)
10 First actuating device (in particular cam of a camshaft)
11 Point close to the slotted guide
12 Spring element
13 Second actuating device (in particular eccentric disk)
15 Cylinder head
A1 First working position of the lift adjuster
A2 Second working position of the lift adjuster
a Acceleration of the gas exchange valve
Bg Base circle region of the working curve
Bh Lift region of the working curve
BKmax Region of a maximum curvature of the utilized working curve
h Lift of the gas exchange valve
hmax Maximum lift
hmill Miller lift
Kmax Maximum curvature of the working curve
KW Crank angle of the internal combustion engine
NK Actuating contour (in particular cam contour) of the first actuating device
OT Top dead center
Phmax Contact position at hmax
Phmill Contact position at hmill
UT Bottom dead center
U10 Circumferential direction of the first actuating device
U13 Circumferential direction of the second actuating device
v Speed of the gas exchange valve

What is claimed is:

1. A variable-lift valve train for a gas exchange valve of an internal combustion engine, comprising:
    a lift adjuster with a working curve that is arrangeable at least in a first working position configured to set a partial lift and in a second working position configured to set a maximum lift, wherein the working curve has a lift region and a base circle region;
    a lift actuator, which has an actuating contour configured to deflect the lift adjuster; and
    a lift lever, which is deflectable via the working curve and thereby actuates a lift of the gas exchange valve, wherein
        the lift adjuster, the lift actuator, and lift lever each have a given contour which cooperate with one another in such a way that during the partial lift of the first working position and during the maximum lift of the second working position the gas exchange valve is actuated with substantially equal acceleration corresponding to a maximum valve acceleration.

2. The valve train according to claim 1, wherein
    the lift adjuster is an intermediate lever,
    the lift actuator is a cam of a camshaft, and
    the lift lever is a roller-type valve lever.

3. The valve train according to claim 1, wherein the contour of the lift actuator is configured to move the working curve in the first working position and in the second working position with an at least substantially constant speed for as long as the contact surface of the lift lever lies against a region of maximum curvature of the working curve and/or is moved beyond said region of maximum curvature in the lift region.

4. The valve train according to claim 3, wherein the region of maximum curvature is arranged at an edge of the lift region.

5. The valve train according to claim 4, wherein the edge of the lift region is that which is passed by a contact element of the lift lever on the working curve at a start and an end of a lift process.

6. The valve train according to claim 5, wherein the lift region has a non-curved region.

7. The valve train according to claim 3, wherein a non-curved region is arranged so as to at least directly adjoin the region of maximum curvature.

8. The valve train according to claim 3, wherein a contact position of the lift lever with the working curve when the maximum lift is reached, and/or a contact position of the lift lever with the working curve when a Miller lift is reached, is arranged at a non-curved region.

9. The valve train according to claim 8, wherein the lift adjuster is an intermediate lever which, at one side, is mounted in a slidingly movable fashion on a slotted-guide track of a slotted guide and which, at the other side, has the working curve, wherein the intermediate lever is displaceable via a second actuating device along the slotted-guide track, and/or
    the lift lever is an intermediate element which includes a roller-type valve lever, via which the working curve is operatively connected to the gas exchange valve, and/or
    the lift actuator is a first actuating device for pivoting the lift adjuster about a point close to the slotted guide counter to a spring force of a spring element.

10. The valve train according to claim 9, wherein the valve train is configured to adapt an actuation time of the lift actuator, via a variable camshaft controller.

11. The valve train according to claim 10, wherein the internal combustion engine has a sensor-based and/or model-based temperature detection device for detecting an exhaust-gas temperature and/or at least one other temperature parameter of the internal combustion engine.

12. The valve train according to claim 11, further comprising: a control unit configured to control operation of the valve train.

13. The valve train according to claim 1, further comprising a second lift actuator, wherein the lift actuator and the second lift actuator rotate in opposite directions.

\* \* \* \* \*